United States Patent [19]

Nakayama et al.

[11] Patent Number: 4,594,174

[45] Date of Patent: Jun. 10, 1986

[54] MAGNETIC PAINT FOR MAGNETIC RECORDING MEDIA

[75] Inventors: Akira Nakayama, Yokosuka; Katsuya Nakamura, Tokyo; Kotaro Hata, Ichikawa; Makoto Yamamoto, Hiratsuka, all of Japan

[73] Assignee: Nippon Zeon Co., Ltd., Tokyo, Japan

[21] Appl. No.: 767,335

[22] Filed: Aug. 21, 1985

[30] Foreign Application Priority Data

Aug. 22, 1984 [JP] Japan ................................ 59-174400

[51] Int. Cl.$^4$ .......................... C04B 35/04; C07F 9/02
[52] U.S. Cl. ............................. 252/62.54; 428/425.9; 428/694; 428/900
[58] Field of Search ............... 252/62.54, 62.53, 62.54

[56] References Cited

U.S. PATENT DOCUMENTS

| 3,526,598 | 9/1970 | Lemke | 252/62.54 |
| 4,153,754 | 5/1979 | Huisman | 252/62.54 |
| 4,333,988 | 6/1982 | Yamada et al. | 252/62.54 |
| 4,460,653 | 7/1984 | Azegaml et al. | 252/62.54 |
| 4,476,035 | 10/1984 | Miyoshi et al. | 252/62.54 |
| 4,507,217 | 3/1985 | Sears | 252/62.54 |
| 4,520,079 | 5/1985 | Nakajima et al. | 252/62.54 |
| 4,543,312 | 9/1985 | Murakawa et al. | 252/62.54 |

Primary Examiner—Arthur P. Demers
Attorney, Agent, or Firm—Sherman & Shalloway

[57] ABSTRACT

A magnetic paint for use in magnetic recording media comprising a magnetic powder and as a binder therefor, a copolymer resin having a bonded carboxyl group content of 0.3 to 5.0% by weight, a bonded epoxy group content of at least 0.5% by weight, and a vinyl chloride unit content of at least 60% by weight.

9 Claims, No Drawings

MAGNETIC PAINT FOR MAGNETIC RECORDING MEDIA

This invention relates to a magnetic paint for magnetic recording media.

Magnetic recording media such as magnetic tapes or cards are generally produced by coating a magnetic paint comprising a magnetic powder and a binder on a substrate such as a polyester film to form a magnetic layer thereon. In recent years, finely divided magnetic metal powders having a high specific surface area have come into use as such a magnetic powder in an attempt to increase coercivity, maximum saturation magnetization, SN ratios and recording density.

The use of ordinary binders such as a vinyl chloride/vinyl acetate/vinyl alcohol terpolymer, a vinyl chloride, vinyl acetate/maleic acid terpolymer, or nitrocellulose, however, leads to the disadvantage that a magnetic paint containing the magnetic metal powder is gelled during preparation, or the magnetic metal powders have insufficient dispersibility. In magnetic paints, a low-molecular-weight surface-active agent is used as a dispersant in order to improve the dispersibility of the magnetic powder. The amount of the dispersant that can be used is limited because when used in large amounts, it will reduce the durability of the resulting magnetic recording medium or cause contamination of a recording head.

On the other hand, in order to increase the durability and reliability of magnetic recording media, attempts are generally made, especially in the production of magnetic videotapes, to crosslink the magnetic layer by adding a flexible material such as a polyurethane resin, a polyester resin or acrylonitrile/butadiene rubber and a crosslinking agent which reacts with a part or the whole of the binder. The binder is therefore required to be compatible with the flexible material and have proper reactivity with the crosslinking agent. The binder is further required in view of the necessity of increasing the reliability of magnetic tapes to have excellent chemical stability and the freedom from generation of decomposition products which will degrade the magnetic powder or cause corrosion of the recording head.

The present inventors have made extensive investigations in order to develop a binder which can meet the higher performance of magnetic recording media, and have found that the use of a specified vinyl chloride resin can give a magnetic paint which maintains high dispersibility, is free from gellation, and has excellent reactivity with crosslinking agents and heat stability, and that a magnetic recording medium obtained by using this magnetic paint has good film surface smoothness and durability and excellent running property, magnetic properties and electromagnetic converting characteristics.

According to this invention, there is provided a magnetic paint for use in magnetic recording media comprising a magnetic powder and as a binder therefor, a copolymer resin having a bonded carboxyl group content of 0.3 to 5.0% by weight, a bonded epoxy group content of at least 0.5% by weight, and a vinyl chloride unit content of at least 60% by weight.

The copolymer in accordance with this invention can be obtained by copolymerizing vinyl chloride, a radical polymerizable monomer having a carboxyl group, a radical polymerizable monomer having an epoxy group, and as required, another monomer copolymerizable with these monomers, in the presence of a polymerization initiator.

Examples of the radical polymerizable monomer having a carboxyl group include unsaturated mono- or dicarboxylic acids such as acrylic acid, methacrylic acid, maleic acid, itaconic acid and crotonic acid, and monoalkyl esters or monoalkanol esters of unsaturated dicarboxylic acids such as maleic acid and itaconic acid. The carboxyl-containing radical polymerizable monomer is used in such a proportion as to provide a carboxyl group content of 0.3 to 5.0% by weight in the resulting copolymer. If it is smaller than the specified limit, the dispersion of a magnetic powder in the copolymer is poor, and if it is larger than the specified limit, the resulting paint tends to be thickened.

Examples of the radical polymerizable monomer having an epoxy group include glycidyl ethers of unsaturated alcohols, such as allyl glycidyl ether and methallyl glycidyl ether; glycidyl esters of unsaturated acids, such as glycidyl acrylate, glycidyl methacrylate, glycidyl p-vinylbenzoate, methyl glycidyl itaconate, glycidyl ethylmaleate, glycidyl vinylsulfonate and glycidyl (meth)allylsulfonate; and olefin epoxides such as butadiene monoxide, vinylcyclohexene monoxide and 2-methyl-5,6-epoxyhexene.

Monomers having both a carboxyl group and an epoxy group may also be used.

Examples of the other monomer that can be used in this invention include vinyl esters of carboxylic acids such as vinyl acetate and vinyl propionate; vinyl ethers such as methyl vinyl ether, isobutyl vinyl ether and cetyl vinyl ether; vinylidene halides such as vinylidene chloride and vinylidene fluoride; unsaturated carboxylic acids such as diethyl maleate, butylbenzyl maleate, dimethyl itaconate, methyl (meth)acrylate, ethyl (meth)acrylate, 2-hydroxyethyl (meth)acrylate, and lauryl (meth)acrylate; olefins such as ethylene and propylene; unsaturated alcohols such as allyl alcohol, 3-buten-1-ol, and 5-hexen-1-ol; unsaturated nitriles such as (meth)acrylonitrile; and aromatic vinyl compounds such as styrene, alpha-methylstyrene and p-methylstyrene. These monomers are properly chosen in order to increase the solubility of a mixture of the copolymer resin in accordance with this invention with another resin while regulating the compatibility of these resins with each other and their softening points, or to improve the properties of the coated film or the coating process.

The copolymer resin in accordance with this invention can be produced by any of known polymerization methods. In view of the solubilty of the polymer, it is preferred to produce it by suspension polymerization using a lower alcohol such as methanol or ethanol or a combination of it with deionized water as a polymerization medium, solution polymerization or emulsion polymerization.

Examples of polymerization initiators which may be used in the production of the copolymer include organic peroxides such as lauroyl peroxide, benzoyl peroxide, 3,5,5-trimethylhexanoyl peroxide, diisopropyl peroxydicarbonate, di-2-ethylhexyl peroxydicarbonate, di-2-ethoxyethyl peroxycarbonate, t-butyl peroxypivalate and t-butyl-peroxyneodecanoate; azo compounds such as 2,2'-azobisisobutyronitrile, 2,2'-azobis-2,4-dimethylvaleronitrile and 4,4'-azobis-4-cyanovalerate; and inorganic peroxides such as ammonium persulfate, potassium persulfate and ammonium perphosphate.

Suspension stabilizers that may be used in the production of the copolymer resin includes, for example, polyvinyl alcohol and a partially saponified product of polyvinyl acetate; cellulose derivatives such as methyl cellulose, hydroxypropyl cellulose and carboxymethyl cellulose; synthetic polymers such as polyvinyl pyrrolidone, polyacrylamide, maleic acid/styrene copolymer, maleic acid/methyl vinyl ether copolymer and maleic acid/vinyl acetate copolymer; and natural polymers such as starch and gelatin.

Suitable emulsifiers that may be used in the production of the copolymer include, for example, anionic emulsifiers such as sodium alkylbenzenesulfonates or sodium laurylsulfate, and nonionic emulsifiers such as polyoxyethylene alkyl ethers and partial esters of polyoxyethylene sorbitan fatty acids.

As required, molecular weight controlling agents such as trichloroethylene or thioglycol may be used in the polymerization process.

The aforesaid polymerization initiator, vinyl chloride, other monomer, suspending agent, emulsifier, molecular weight controlling agent, etc. may be added at a time to the polymerization at the start of the polymerization, or may be added portionwise during the polymerization. The polymerization is carried out with stirring, usually at a temperature of 35° to 80° C.

The copolymer resin in accordance with this invention can also be obtained by copolymerizing vinyl chloride and the epoxy-containing monome optionally with a monomer copolymerizable with these monomers in the presence of a polymerization initiator to form a vinyl chloride copolymer containing epoxy groups, and subjecting the copolymer to addition-reaction with a compound having carboxyl groups. Examples of the monomers that can be used in the copolymerization process and the method of copolymerization may be the same as those given hereinabove.

Examples of the compound having carboxyl groups which is to add to the vinyl chloride copolymer containing epoxy groups include polycarboxylic acids having at least two carboxyl groups, such as oxalic acid, malonic acid, succinic acid, adipic acid, maleic acid, fumaric acid, phthalic acid, and trimellitic acid, and sulfocarboxylic acids such as sulfobenzoic acid. To inhibit a crosslinking reaction during the addition-reaction and introduce the carboxyl groups effectively into the copolymer, it is preferred to use compounds having carboxyl groups in which the difference in dissociation constant between the two acids is large and the dissociation constant ($pK_{a1}$) of a stronger acid is not more than 4. The addition reaction can be carried out in solution or suspension (emulsion) using water or a waste water medium. It can also be carried out by directly mixing the epoxy-containing vinyl chloride copolymer with the compound having a carboxyl group.

The copolymer resin in accordance with this invention has an average degree of polymerization of 100 to 900, preferably 200 to 500, and a vinyl chloride unit content of at least 60% by weight. If the degree of polymerization is not more than 100, the abrasion resistance of the magnetic layer is insufficient. If it exceeds 900, the viscosity of the paint is high and the dispersion of the magnetic powder in it tends to be insufficient. On the other hand, when the content of the vinyl chloride units is less than 60% by weight, the compatibility of the copolymer resin with a flexible material is reduced, or the separation of the solvent from the coated film is drastically reduced.

The content of the carboxyl groups bonded to the copolymer resin should be 0.3 to 5.0% by weight. If it is smaller than the specified limit, the dispersion of the magnetic powder in the copolymer resin is poor, and if it is larger than the specified limit, the paint tends to be gelled and thickened. The content of the epoxy groups bonded to the resin should be at least 0.5% by weight. If it is less than 0.5% by weight, the thermal stability of the resin is insufficient.

The copolymer resin used in this invention, as is the case with ordinary vinyl chloride resin binders for magnetic paints, is prepared as a solution in a solvent together with a flexible material such as a polyurethane resin, polyester resin or acrylonitrile-butadiene copolymer, a crosslinking agent typified by polyisocyanates, and a magnetic powder, and as required, other known materials such as a lubricant, a dispersant, an antistatic agent and an abrasive agent.

Since a magnetic coated film obtained by using the resin in accordance with this invention can exhibit excellent heat stability owing to the epoxy groups in the resin, it permits the production of a magnetic recording medium which has excellent reliability and does not easily corrode a recording head. Moreover, by utilizing the reactivity of the epoxy groups, the coated film can be crosslinked with a polyamine compound or a polycarboxylic acid compound. Furthermore, since the copolymer in accordance with this invention has both carboxyl groups and epoxy groups, it has self-crosslinkability, namely the property of being crosslinked in the absence of a crosslinking agent.

If desired, the resin in accordance with this invention may be used in combination with an ordinary resin binder for magnetic paints, such as vinyl chloride/vinyl acetate copolymer resin, vinyl chloride/vinyl alcohol/-vinyl acetate copolymer resin, a cellulosic resin, a phenoxy resin, an amino resin, an epoxy resin, a butyral resin and an acrylic resin in types and amounts which lead to the achievement of the purpose of the present invention.

The magnetic powder that can be used in this invention is a magnetic metal powder, and specific examples include powders of iron oxides such as gamma-$Fe_2O_3$, $Fe_3O_4$, Co-containing gamma-$Fe_2O_3$, Co-containing $Fe_3O_4$ and barium ferrite, a powder of $CrO_2$, a powder of Fe, a powder of Co and a powder of Ni-Fe.

The amount of the copolymer resin used as a binder in the present invention is usually 5 to 50 parts by weight per 100 parts by weight of the magnetic powder.

The following examples illustrate the present invention specifically. All parts in these examples are by weight.

EXAMPLES OF SYNTHESIZING RESINS

EXAMPLE 1

An autoclave was charged with 5 parts of vinyl acetate, 3 parts of itaconic acid, 100 parts of methanol, 100 parts of deionized water, 0.6 part of methyl cellulose, 0.2 part of polyoxyethylene sorbitan fatty acid ester, 0.35 part of trichloroethylene, 0.42 part of 3,5,5-trimethylhexanoyl peroxide and 1.0 part of sodium bicarbonate. The inside of the autoclave was deaerated, and 100 parts of vinyl chloride was added. At a temperature of 58° C., the polymerization was started. At the same time, a mixture of 5 parts of 2-hydroxypropyl methacrylate, 10 parts of glycidyl methacrylate and 25 parts of methanol was introduced continuously into the autoclave. The introduction of the mixture was terminated before the pressure of the autoclave reached 5 kg/cm$^2$.

Thereafter, when the pressure of the autoclave reached 3 kg/cm$^2$, the unreacted vinyl chloride was recovered, and by removing the liquid, the copolymer was recovered. It was washed with cold water and then dried to give a copolymer (A).

EXAMPLE 2

An autoclave was charged with 10 parts of allyl glycidyl ether, 250 parts of deionized water, 2 parts of potassium persulfate, 3 parts of sodium laurylsulfate and 0.7 part of sodium hydroxide. After deaeration, 100 parts of vinyl chloride and 10 parts of vinylidene chloride were added, and the polymerization was started at 60° C. At the same time, a mixture of 3 parts of acrylic acid and 27 parts of deionized water was continuously introduced into the autoclave, and the introduction was terminated before the pressure of the autoclave reached 6 kg/cm$^2$. When the pressure of the autoclave reached 3 kg/cm$^2$, the unreacted vinyl chloride was recovered. The resulting dispersion was frozen and then thawed. By removing the liquid, the copolymer was recovered. It was washed with warm water and then dried to give a copolymer (B).

COMPARATIVE EXAMPLE 1

An autoclave was charged with 20 parts of allyl glycidyl ether, 0.5 part of polyacrylamide, 0.2 part of polyoxyethylene lauryl ether, 200 parts of deionized water, 1 part of t-butyl peroxypivalate and 1 part of sodium bicarbonate. After deaeration, 50 parts of vinyl chloride was added, and the polymerization was started at 52° C. After the starting of the polymerization, 10 parts of vinyl chloride in five divided portions was introduced into the autoclave every 2 hours. When the pressure of the autoclave reached 5 kg/cm$^2$, the unreacted vinyl chloride was recvered. The liquid was removed, and the residue was washed with water and dried to give a copolymer (C).

EXAMPLE 3

Ten parts of the copolymer (C) obtained in Comparative Example 1 was dissolved in 40 parts of tetrahydrofuran, and 1.0 part of malonic acid was added. They were mixed at 60° C. for 2 hours. The mixture was put in 500 parts of deionized water. The liquid was removed, and the precipitate was recovered and again dissolved in 40 parts of tetrahydrofuran. The solution was put in 500 parts of deionized water. The precipitate was recovered and dried to give a modified copolymer (D).

COMPARATIVE EXAMPLE 2

A copolymer (E) was obtained by repeating Example 1 except that the amount of itaconic acid was changed to 20 parts, the amount of 3,5,5-trimethylhexanoyl peroxide was changed to 1.0 part, and trichloroethylene was not used.

COMPARATIVE EXAMPLE 3

A copolymer (F) was obtained by repeating Example 1 except that glycidyl methacrylate was not used.

COMPARATIVE EXAMPLE 4

A copolymer (G) was obtained by repeating Example 2 except that the amount of vinyl chloride was changed to 70 parts, and the amount of vinylidene chloride was changed to 40 parts.

The properties of the copolymer resins obtained in Examples 1 to 3 and Comparative Examples 1 to 4 and commercial vinyl chloride/vinyl acetate/maleic acid terpolymer (H) and commercial vinyl chloride/vinyl acetate/vinyl alcohol terpolymer (I) were determined, and the results are shown in the following table. The vinyl chloride unit content was determined by the determination of the amount of chlorine by burning and C$^{13}$-NMR, and the epoxy group content and the carboxyl group content were determined by titration.

Evaluation of the properties of the magnetic paints and magnetic recording media Magnetic paints and magnetic recording media were produced by using the resins A to I, and tested for their properties. The results are also tabulated. The testing methods were as follows:

(1) Solubility

A solution composed of 100 parts of the vinyl chloride copolymer, 200 parts of methyl ethyl ketone and 200 parts of toluene was prepared. The transparency of the solution was visually observed, and evaluated on the following scale.

O: transparent (completely disssolved)
Δ: non-transparent (imperfectly dissolved)
X: swollen without dissolution

(2) Heat stability

The vinyl chloride copolymer (1.0 g) was taken into a 15 cc test tube, and its opening portion was stopped by an absorbent cotton holding Congo Red test paper. The test tube was placed in an oil bath at 150° C., and the time (minutes) which elasped until the COngo Red test paper changed in color by generated HCl was measured.

(3) Dispersion stability

A mixture composed of 400 parts of a magnetic cobalt-doped iron oxide powder, 100 parts of the vinyl chloride copolymer, 300 parts of methyl ethyl ketone, 300 parts of methyl isobutyl ketone and 300 parts of toluene was dispersed under high speed shear for 90 minutes. The resulting dispersion was taken into a sample bottle, and stored in a constant temperature bath at 25° C. The state of occurrence of a gel was observed. The occurrence of a gel was determined by taking out a portion of the dispersion on a glass plate, diluting it with about 5 times its amount of methyl ethyl ketone, and observing the dilution visually while stirring it with a glass rod. The amount of the gel was expressed on a scale of O (no gel formed), Δ (a small amount of gel formed) and X (a large amount of gel formed).

(4) Gloss (1)

A mixture composed of 400 parts of a Co-doped iron oxide powder, 60 parts of the vinyl chloride copolymer, 40 parts of a polyurethane resin (Nippolane 2304, a product of Nippon Polyurethane Industry Co., Ltd.), 300 parts of methyl ethyl ketone, 300 parts of methyl isobutyl ketone, 300 parts of toluene, and 4 parts of lecithin was dispersed under high-speed shear for 90 minutes, and then 15 parts of polyisocyanate (Coronate L, a product of Nippon Polyurethane Industry Co., Ltd.) was added. The mixture was further dispersed for 15 minutes. The resulting magnetic coating composition (magnetic paint) was coated on a polyester film to a thickness of 5 micrometers, subjected to a magnetic field orientation treatment, and dried. The reflectance of the magnetic coated layer at a reflection angle of 60° was measured by a glossmeter.

(5) Gloss (2)

The reflectance was measured by the same method as in Gloss (1) above except that polyamide (Versamide 125, a product of General Mills, Inc.) was used instead of the polyisocyanate, and the amount of the polyurethane resin was changed to 20 parts.

(6) Squareness ratio (Br/Bm)

A sample having a size of 12.5 mm×50 mm was cut out from the magnetic coated layer used in the measurement of gloss, and the squareness ratio of the sample was measured by a magnetic characteristic measuring device.

(7) Durability

The magnetic coated layer used in the measurement of gloss was smoothed by a calender roll, and heat-treated at 65° C. for 65 hours. It was then kept in contact under a load of 100 g with a rotating drum having abrasive paper attached to its surface. The drum was rotated at a speed of 150 rpm, and the amount of the magnetic paint adhering to the abrasive paper at this time was visually observed and expressed on the following scale.

O: little or no adhesion
Δ: some adhesion
X: much adhesion

(8) Running property

The force generated between the magnetic coated layer and the rotating drum was measured by a U gauge in an atmosphere kept at a temperature of 65° C. and a relative humidity of 80% by the same method as in the durability test. The result is expressed on the following scale.

O: resistance low
Δ: resistance medium
X: resistance high

TABLE

| | Example | | | Comparative Example | | | | | |
|---|---|---|---|---|---|---|---|---|---|
| | 1 | 2 | 3 | 1 | 2 | 3 | 4 | 5 | 6 |
| properties of the copolymer | | | | | | | | | |
| Sample designation | A | B | D | C | E | F | G | H | I |
| Vinyl chloride (wt. %) | 79 | 80 | 84 | 80 | 70 | 90 | 50 | 86 | 91 |
| Carboxyl groups (wt. %) | 1.0 | 2.0 | 0.5 | — | 8.0 | 1.3 | 1.9 | 0.8 | — |
| Epoxy groups (wt. %) | 2.8 | 1.8 | 2.5 | 4.5 | 1.2 | — | 1.6 | — | — |
| Degree of polymerization | 410 | 450 | 370 | 300 | 340 | 460 | 470 | 400 | 430 |
| Properties of the magnetic paint or the magnetic recording medium | | | | | | | | | |
| Solubility | | | | | Δ | | | | |
| Heat stability (minutes) | 54 | 40 | 50 | >60 | 25 | 15 | 40 | 15 | 6 |
| Dispersion stability | | | | The magnetic powder did not disperse uniformly, and a magnetic paint could not be obtained. | X | Δ | — | X | X |
| Gloss (1) (%) | 91 | — | 87 | 94 | 32 | 90 | 54 | 68 | 52 |
| Gloss (2) (%) | — | 93 | — | — | — | — | — | — | — |
| Squareness ratio | 0.84 | 0.85 | 0.83 | 0.85 | 0.72 | 0.82 | 0.77 | 0.77 | 0.77 |
| Durability | | | | | X | | Δ | Δ | X |
| Running property | | | | | X | Δ | X | X | | therefor, a copolymer resin having a bonded carboxyl group content of 0.3 to 5.0% by weight, a bonded epoxy group content of at least 0.5% by weight, and a vinyl chloride unit content of at least 60% by weight.

2. The magnetic paint of claim 1 wherein the copolymer resin has an average degree of polymerization of 100 to 900.

3. The magnetic paint of claim 1 wherein the copolymer resin is a copolymer derived from vinyl chloride, a radical polymerizable monomer having a carboxyl group, a radical polymerizable monomer having an epoxy group and as required, another monomer copolymerizable with these monomers.

4. The magnetic paint of claim 3 wherein the radical polymerizable monomer having a carboxyl group is selected from unsaturated monocarboxylic acids, unsaturated dicarboxylic acids, monoalkyl esters of unsaturated dicarboxylic acids, and monoalkanol esters of unsaturated dicarboxylic acids.

5. The magnetic paint of claim 3 wherein the radical polymerizable monomer having an epoxy group is selected from glycidyl ethers of unsaturated alcohols, glycidyl esters of unsaturated acids and olefin epoxides.

6. The magnetic paint of claim 3 wherein the other monomer is selected from vinyl esters of carboxylic acids, vinyl ether, vinylidene halides, unsaturated carboxylic acid esters, olefins, unsaturated alcohols, unsaturated nitriles and aromatic vinyl compounds.

7. The magnetic paint of claim 1 wherein the copolymer resin is the addition-reaction product of a copolymer of vinyl chloride, a monomer having an epoxy group and optionally another monomer copolymerizable with these monomers, with a compound having a carboxyl group.

8. The magnetic paint of claim 7 wherein the radical polymerizable monomer having an epoxy group is selected from glycidyl ethers of unsaturated alcohols, glycidyl esters of unsaturated acids, and olefin epoxides.

9. The magnetic paint of claim 7 wherein the other monomer is selected from vinyl esters of carboxylic acids, vinyl ethers, vinylidene halides, unsaturated carboxylic acid esters, olefins, unsaturated alcohols, unsat-

What is claimed is:

1. A magnetic paint for use in magnetic recording media comprising a magnetic powder and as a binder urated nitriles and aromatic vinyl compounds.

* * * * *